(12) United States Patent
Jones

(10) Patent No.: US 12,647,466 B2
(45) Date of Patent: Jun. 2, 2026

(54) SSH ENGINE(S) FOR GENERATING USER SPECIFIC SSH CONFIGURATION FILES

(71) Applicant: Oracle International Corporation,
Redwood City, CA (US)

(72) Inventor: Timothy Paul Jones, Ash Vale (GB)

(73) Assignee: Oracle International Corporation,
Redwood City, CA (US)

( * ) Notice: Subject to any disclaimer, the term of this
patent is extended or adjusted under 35
U.S.C. 154(b) by 220 days.

(21) Appl. No.: 18/652,640

(22) Filed: May 1, 2024

(65) Prior Publication Data

US 2025/0343824 A1 Nov. 6, 2025

(51) Int. Cl.
*H04L 9/40* (2022.01)
(52) U.S. Cl.
CPC ............ *H04L 63/205* (2013.01); *H04L 63/08*
(2013.01); *H04L 63/10* (2013.01)
(58) Field of Classification Search
CPC ....... H04L 63/205; H04L 63/08; H04L 63/20;
H04L 63/10
See application file for complete search history.

(56) References Cited

U.S. PATENT DOCUMENTS

| | | | | |
|---|---|---|---|---|
| 11,811,599 | B1* | 11/2023 | Du | H04L 41/0866 |
| 2016/0373268 | A1* | 12/2016 | Matsuoka | H04L 41/0853 |
| 2017/0041349 | A1* | 2/2017 | Ylonen | H04L 9/3268 |
| 2018/0191725 | A1* | 7/2018 | Luukkala | H04L 63/166 |
| 2022/0129155 | A1* | 4/2022 | Kasso | G06F 11/1464 |
| 2022/0365801 | A1* | 11/2022 | Kasso | G06F 9/45558 |
| 2023/0359507 | A1* | 11/2023 | Meck | G06F 21/53 |

* cited by examiner

*Primary Examiner* — Chau Le

(57) ABSTRACT

Various embodiments of the present technology generally
relate to systems and methods for providing an SSH engine.
In an example, a method includes receiving, by an SSH
engine, a request for a Secured Shell (SSH) configuration
file from a client device. The SSH engine may then deter-
mine access privileges associated with the client device and
generate rules based on the access privileges. The access
privileges may identify resources that the client device has
authority to access. The SSH engine may then validate each
rule of the rules based on the access privileges and generate
the SSH configuration file including the rules for the client
device.

20 Claims, 5 Drawing Sheets

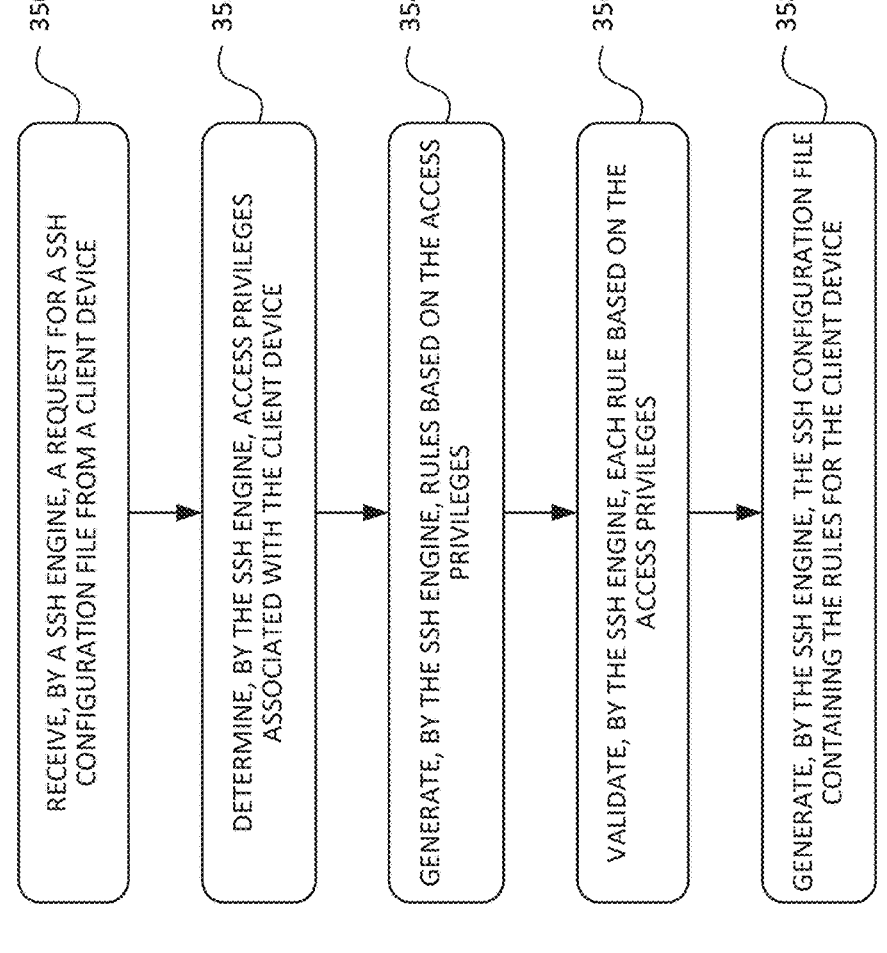

350 — RECEIVE, BY A SSH ENGINE, A REQUEST FOR A SSH CONFIGURATION FILE FROM A CLIENT DEVICE

352 — DETERMINE, BY THE SSH ENGINE, ACCESS PRIVILEGES ASSOCIATED WITH THE CLIENT DEVICE

354 — GENERATE, BY THE SSH ENGINE, RULES BASED ON THE ACCESS PRIVILEGES

356 — VALIDATE, BY THE SSH ENGINE, EACH RULE BASED ON THE ACCESS PRIVILEGES

358 — GENERATE, BY THE SSH ENGINE, THE SSH CONFIGURATION FILE CONTAINING THE RULES FOR THE CLIENT DEVICE

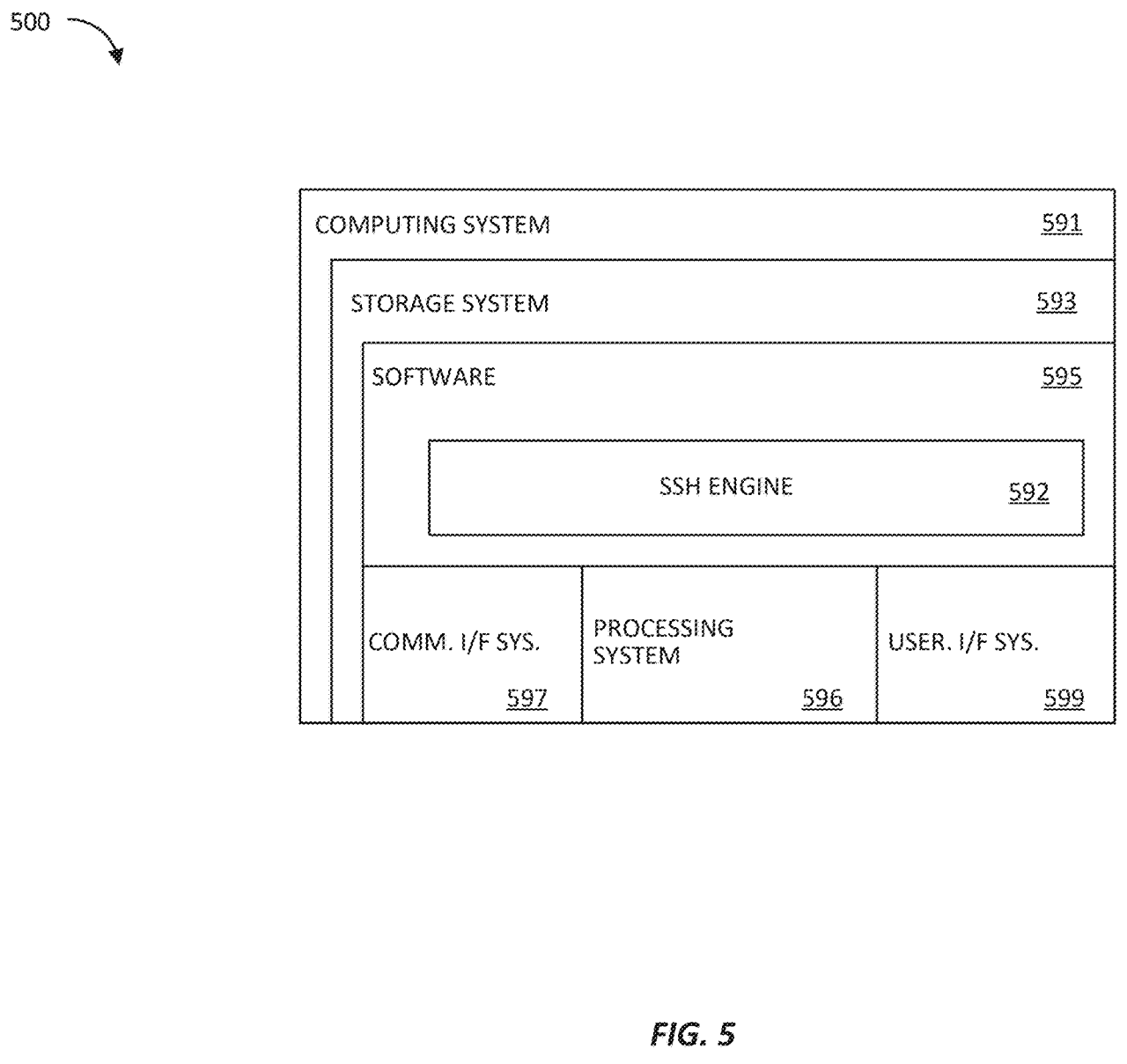

COMPUTING SYSTEM 591

STORAGE SYSTEM 593

SOFTWARE 595

SSH ENGINE 592

COMM. I/F SYS. 597

PROCESSING SYSTEM 596

USER. I/F SYS. 599

FIG. 5

SSH ENGINE(S) FOR GENERATING USER SPECIFIC SSH CONFIGURATION FILES

TECHNICAL FIELD

Various embodiments of the present technology generally relate to cloud services, operations and software. More specifically, embodiments of the present technology relate to systems and methods for providing SSH engine(s) for generating user specific Secured Shell (SSH) configuration files.

BACKGROUND

In recent years, the proliferation of cloud computing has transformed the landscape of IT infrastructure. With its promise of scalability, flexibility, and cost-efficiency, cloud computing has become increasingly common across industries and sectors. As organizations migrate their workloads to the cloud, computing resources are no longer confined to traditional data centers but are instead distributed across various geographic regions. This geographic dispersion of computing resources introduces new challenges and complexities in managing and accessing these resources remotely.

To address the need for remote access to geographically dispersed computing resources, SSH configuration files play a vital role. SSH, a cryptographic network protocol, provides a secure channel for accessing and managing remote systems over an unsecured network. SSH configuration files allow administrators to define settings and parameters for SSH connections, including hostnames, IP addresses, authentication methods, and access controls. By configuring SSH settings, administrators can securely connect to cloud-based servers, virtual machines, and other computing resources from anywhere in the world. Additionally, SSH configuration files enable the implementation of security measures such as key-based authentication and tunneling, ensuring the confidentiality and integrity of data transmitted over the network. As organizations continue to embrace cloud computing and adopt geographically dispersed infrastructures, SSH configuration files remain essential tools for managing and securing remote access to computing resources.

The conventional approach to managing SSH configuration files within organizations often falls short in meeting the specific access needs of individual users or teams. Typically, a generic, shared SSH config file is circulated throughout the organization, containing rules applicable to all regions and resources, regardless of whether users have access to them. This blanket approach leads to inefficiencies and security risks, as users are burdened with excess information that may not be relevant to their roles or responsibilities. Moreover, the inclusion of rules for all regions in a single SSH config file increases the likelihood of configuration errors and conflicts, potentially compromising the security and integrity of remote access. Additionally, the lack of granularity in these shared config files impedes scalability and flexibility, making it challenging to adapt to evolving access requirements and organizational changes. As a result, organizations face difficulties in maintaining a streamlined and secure SSH configuration environment, highlighting the need for more dynamic and tailored solutions to manage remote access effectively.

Accordingly, there exists a need for SSH engine(s) for generating user specific SSH configuration files. In other words, there is a need for the SSH engine provided herein that generates improved SSH configuration files that are tailored to a respective user's needs and access privileges.

The information provided in this section is presented as background information and serves only to assist in any understanding of the present disclosure. No determination has been made and no assertion is made as to whether any of the above might be applicable as prior art with regard to the present disclosure.

OVERVIEW

Technology is disclosed herein for systems and techniques for providing an SSH engine. In an aspect, an SSH engine is provided to generate user specific SSH configuration files. That is, the SSH engine may generate an SSH configuration file specific to a user and based on access privileges associated with the user. To generate the SSH configuration file, the SSH engine may receive a request and determine a user associated with the request. Responsive to determining the user, the SSH engine may determine access privileges associated with the user. Based on the access privileges, the SSH engine may determine what resources the user is authorized to access. As used herein, resources include realms, regions, and resource types, as well as end resources, such as servers and other hardware components.

Once the SSH engine determines what resources the user is authorized to access, the SSH engine may identify rules associated with accessing each respective resource. As those skilled in the art readily appreciate, rules within an SSH configuration file may include various information and protocols for navigating to and gaining access to a desired resource. For example, rules may include host definitions (e.g., hostname, IP addresses, port numbers), user authentication settings or protocols, connection settings, SSH key management information, logging and debugging options, security options, and global configurations settings. The SSH engine may loop through each resource associated with a respective organization to determine rules to be included in the SSH configuration file. In some cases, the SSH engine may determine rules to be included by access level. For example, if the user has access privileges to a region, then the SSH engine may include rules for accessing all resources within that region. Similarly, if the user has access privileges to a realm, then the SSH engine may include rules for accessing all resources (e.g., regions and end-resources) within that realm.

Once the SSH engine determines rules that are applicable to the user based on the user's access privileges, then the SSH engine may validate each of the rules. As will be described in greater detail below, validating each of the rules may include performing one or more authentication processes associated with the rules or using the rules to access a respective resource. By validating each rule, the SSH engine ensures that the SSH configuration file includes the most up-to-date information and any limitations with a user's access privileges can be addressed prior to use of the SSH configuration file. Upon validation of the rules, the SSH engine may generate the SSH configuration file and provide it to the user.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

The accompanying drawings, which are incorporated into and constitute a part of this specification, illustrate one or more certain aspects and, together with the description of the example, serve to explain the principles and implementations of the certain examples.

FIG. 3 illustrates an example SSH engine process, according to an embodiment herein;

FIG. 5 shows an example computing device suitable for providing an SSH engine and its related functions, according to an embodiment herein.

Figure 1:
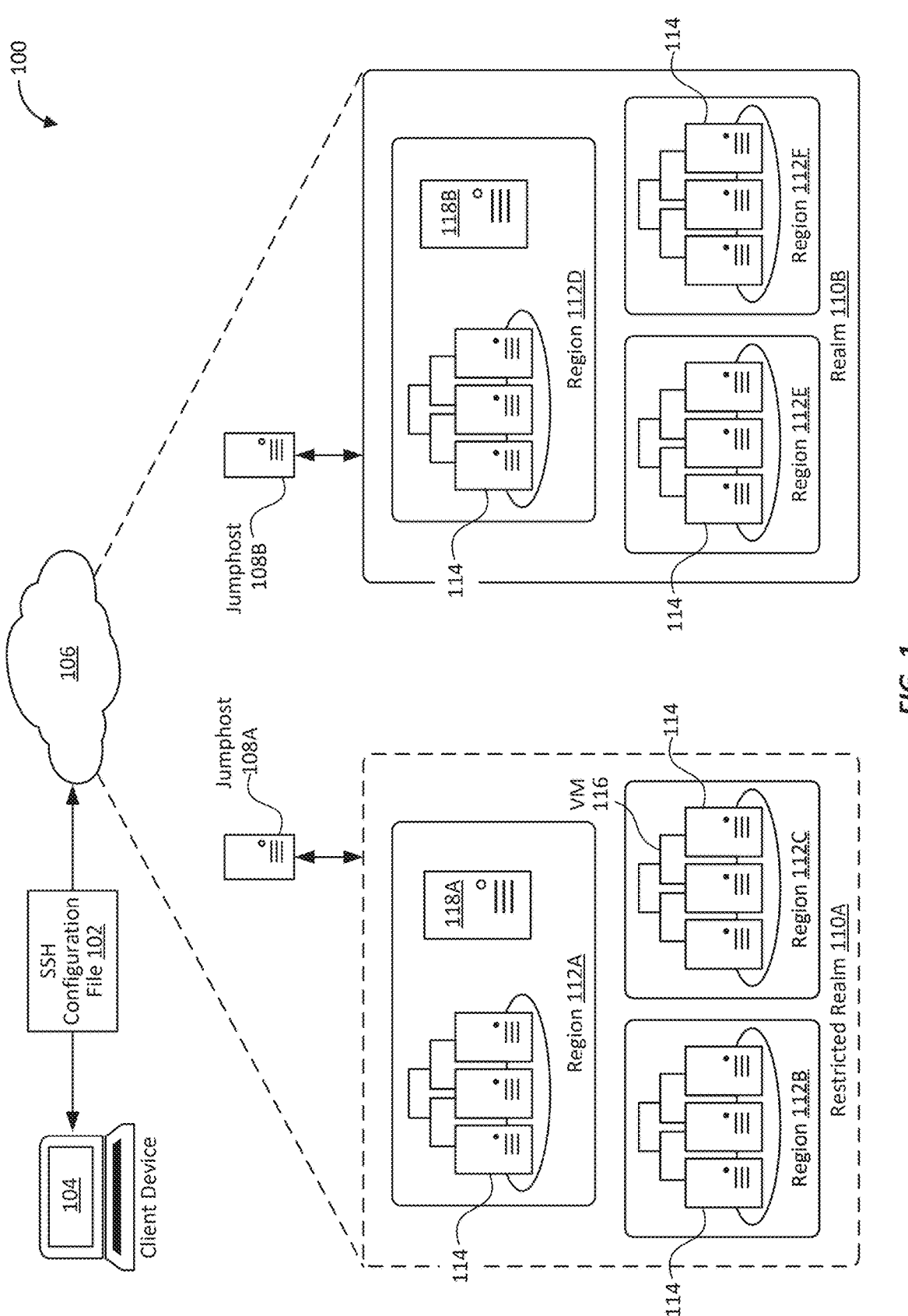
FIG. 1 illustrates an example operational environment in which an SSH configuration file is used to access remote resources, according to an embodiment herein.

Some components or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

In recent years, the proliferation of cloud computing has fundamentally reshaped the IT landscape, revolutionizing how businesses manage and deploy their infrastructure. The allure of cloud computing lies in its promise of scalability, flexibility, and cost-efficiency, driving its widespread adoption across various industries and sectors. As organizations increasingly migrate their workloads to the cloud, computing resources are no longer tethered to traditional data centers but are instead scattered across diverse geographic regions. For example, computing resources, also referred to herein as "assets," may be spread across various regions within a country or in different countries all together. This decentralization of computing resources presents novel challenges and complexities in both managing and accessing these resources from remote locations.

As noted above, to navigate the intricacies of remote access to geographically dispersed computing resources, SSH configuration files emerge as indispensable tools in an administrator's arsenal. SSH, a robust cryptographic network protocol, serves as the linchpin for establishing secure channels for accessing and managing remote systems over potentially insecure networks. Within SSH configuration files lie the keys to fine-tuning a myriad of settings and parameters crucial for SSH connections. From defining hostnames and IP addresses to configuring authentication methods and access controls, administrators wield unparalleled control over remote access policies. This granular control empowers administrators to securely traverse the expansive cloud landscape, effortlessly connecting to cloud-based servers, virtual machines, and a plethora of computing resources from any corner of the globe. Furthermore, SSH configuration files serve as the bastion for fortifying network security through the implementation of advanced measures such as key-based authentication and tunneling. These mechanisms ensure the utmost confidentiality and integrity of data transmitted over the network, safeguarding critical assets against potential security breaches. As organizations increasingly embrace the paradigm shift towards cloud computing and embrace the complexities of geographically dispersed infrastructures, SSH configuration files stand resilient as indispensable assets for effectively managing and securing remote access to computing resources.

Conventional approaches to SSH configuration files, however, present a myriad of shortcomings. For example, the conventional approach to SSH configuration files within organizations often entails the sharing of a single, overarching configuration file among various departments or teams. This generic SSH configuration file typically encompasses access rules and settings for all computing resources accessible to the organization or specific groups within it. Consequently, irrespective of individual user roles or access privileges, each user is provided with the same configuration file containing information for accessing all available resources. While this method may simplify administrative tasks, it leads to a bloated and unwieldy configuration file that lacks granularity and specificity.

One issue caused by the conventional, one-size-fits-all approach to SSH configuration files is the inclusion of extraneous rules and information. That is, users who lack authorization to access certain assets or regions are burdened with a configuration file containing irrelevant rules and information. This redundancy not only clutters the configuration but also poses security risks, as users may inadvertently attempt to access restricted resources due to the indiscriminate inclusion of access rules. Moreover, maintaining and updating such a comprehensive configuration file becomes increasingly challenging as the organization scales, leading to inconsistencies, errors, and potential security vulnerabilities.

For example, the inclusion of irrelevant or extraneous rules within conventional SSH configuration files exacerbates the challenge of troubleshooting and identifying issues within the configuration. When confronted with bugs or discrepancies, system administrators must sift through a multitude of rules, many of which may not be relevant to the user's access requirements. This unnecessary complexity not only prolongs the troubleshooting process but also increases the likelihood of overlooking critical configuration errors. Moreover, the presence of redundant rules complicates version control and change management, making it arduous to track modifications and identify the root cause of configuration-related issues. Consequently, rectifying bugs or addressing configuration inconsistencies becomes a time-consuming and error-prone endeavor, undermining the overall efficiency and reliability of the SSH configuration management process. Thus, the indiscriminate inclusion of extra rules within SSH configuration files not only hampers operational efficiency but also impedes the organization's ability to maintain a robust and secure remote access infrastructure.

Additionally, these conventional SSH configuration files often encounter issues when used across different operating systems due to compatibility issues and divergent configuration requirements. While SSH is a cross-platform protocol, the nuances of individual operating systems can lead to inconsistencies and errors when applying a one-size-fits-all configuration approach. For instance, configuration directives that work seamlessly on one operating system may not be supported or may have different syntax on another. This can result in errors during SSH connection establishment, authentication failures, or unexpected behavior when accessing remote systems. Furthermore, operating system-specific features or security mechanisms may not be adequately addressed in a generic configuration file, potentially exposing systems to security vulnerabilities or hindering functionality.

Another issue with conventional SSH configuration files is that rules, or keys used by the rules to access various resources, are only validated at the time a user attempts to utilize the SSH configuration file for connecting to a remote system. This means that errors or misconfigurations within the file may go undetected until an actual connection attempt is made. Consequently, users may encounter unexpected connection failures or authentication errors when trying to access remote systems, leading to frustration and productivity losses. Moreover, the lack of proactive validation mechanisms within the conventional SSH configuration file increases the likelihood of overlooking potential security vulnerabilities or misconfigurations that could compromise the integrity of the SSH environment.

To address the issues with conventional SSH configuration files, example SSH engines are provided herein. In particular, an example SSH engine provided herein generates SSH configuration files based on a requesting user. That is, the SSH engine generates an SSH configuration file specifically for a user such that the SSH configuration file contains only rules and information relevant to that user. For example, an SSH configuration file generated for a user may only include rules for accessing resources that the user has access privileges for and include configuration settings or rules for a respective operating system on which the SSH configuration file will be run on.

By tailoring an SSH configuration file to a user, the SSH engine enhances the security and accessibility of using the SSH configuration file for accessing remote resources. Additionally, the SSH engine ensures a more seamless SSH management process by reducing extraneous rules and resources within a respective SSH configuration file, thereby minimizing potential sources of errors or bugs. As can be appreciated, by reducing maintenance and troubleshooting time needed to address errors or bugs in an SSH configuration file, organizations can enhance operational efficiency, minimize downtime, and mitigate potential security risks. The streamlining provided by the SSH engine allows IT teams to allocate resources more effectively, focusing on strategic initiatives rather than tedious, time-consuming maintenance tasks. Additionally, faster resolution of configuration issues leads to improved user experience and satisfaction, ultimately contributing to overall productivity and performance.

As will be expanded on below, the SSH engine not only generates an SSH configuration file based on a requesting user, but the SSH engine also validates the rules prior to generating the SSH configuration file. That is, when a user requests an SSH configuration file, the SSH engine determines the rules associated with the resources that the user has authority to access and validates that the user can access the resources using the rules. For example, the rules may include keys or contain authorization processes. As such, the SSH engine may perform the authorization process or attain the keys using the rules to ensure the validity of the user's access privileges. Once the rules are validated, the SSH engine generates the SSH configuration file for the user containing the validated rules.

As can be appreciated, by validating the rules before generating the SSH configuration file, the SSH engine can identify any limitations to the user's access privileges prior to the use of the SSH configuration file. This may allow the user time to identify and rectify any issues with his or her access privileges (e.g., expiration of authorization). By ensuring that the rules are valid, the SSH configuration file generated by the SSH engine enhances operational efficiency and minimizes downtime, thereby improving user experience and overall system performance.

Turning now to the Figures, FIG. 1 illustrates an example operational environment 100 in which an SSH configuration file 102 is used to access remote resources, according to an embodiment herein. As illustrated, a client device 104 may use an SSH configuration file 102 to access remote assets or resources that are spread across geographically distinct regions. That is, the SSH configuration file 102 may be or include a cryptographic network protocol that allows the client device 104 to access and manage remote resources, such as virtual machine (VM) 116 or database platforms 118A-B. For example, the SSH configuration file 102 may contain a variety of rules and directives specifying various parameters, such as hostnames, IP addresses, authentication methods, and access controls, necessary for initiating secure connections with a respective resource. As noted above, the SSH configuration file 102 may establish and provide a secure channel between the client device 104 and the respective resource.

As shown, the operational environment 100 includes a cloud-infrastructure 106 that provides various resources or end-resources, such as virtual machine (VM) 116 and database platforms 118A-B. The cloud-infrastructure 106 may include a variety of realms 110A-B. The realm 110A may be a restricted realm and the realm 110B may be an unrestricted realm. For example, the restricted realm 110A may contain resources that are restricted and have heightened security protocols, such as a government realm. In contrast, the unrestricted realm 110B may contain resources that don't require heightened authorization to access, such as an organizational or business realm. As should be appreciated, the operational environment 100 is a simplified example and as such, in reality the cloud-infrastructure 106 may include more realms 110A-B.

Each of the realms 110A-B may include multiple regions 112A through 112F (hereinafter "112A-F"). The regions 112A-F may be geographically distinct or separate regions in which resources are housed. For example, the region 112A may be a datacenter in Minneapolis, Minnesota, while the region 112B may be a datacenter in Phoenix, Arizona. Again, the operational environment 100 is a simplified example and as such in practice each of the realms 110A-B may contain any number of regions 112A-F. Each of the regions 112A-F may contain numerous end-resources, such as servers 114 on which resources are provisioned to provide cloud-based services and applications, such as the VMs 116 and database platforms 118.

As can be appreciated, each step of accessing a respective resource, such as the database platform 118B may require a specific rule that directs the client device 104 to connect to an appropriate component within the cloud-infrastructure 106. That is, to navigate through the cloud-infrastructure 106 and establish a connection with the database platform 118B, the client device 104 requires rules that provide a "map" to the database platform 118B as well as any associated authorizations or keys that authenticate the client device 104 as having access privileges to access the database platform 118B.

The database platforms 118A-B may be platforms that are designed to run database workloads, such as Oracle's Exadata. As such, the SSH configuration file 102 may include settings related to accessing and managing the database platforms 118A-B systems remotely. These settings could involve specifying parameters such as the hostname or IP address of the database platforms 118A-B, the SSH port, authentication methods, and any additional configurations required for secure remote access. SSH is commonly used for managing and administering servers, including database servers like Oracle Exadata, due to its secure encrypted communication capabilities. Therefore, in the SSH configuration file 102, settings specific to the database platforms 118A-B enable administrators to securely connect to and manage these high-performance database appliances remotely.

Following the above example, when the client device 104 seeks to connect with the database platform 118B, the client device 104 may communicate with the cloud-infrastructure 106. The client device 104 may communicate with the cloud-infrastructure 106 via one or more internets and intranets, the Internet, wired and wireless networks, local area networks (LANs), wide area networks (WANs), or any other type of network or combination thereof. Examples of the client device 104 may include personal computers, tablet computers, mobile phones, gaming consoles, wearable devices, Internet of Things (IoT) devices, and any other suitable devices, of which computing apparatus 691 in FIG. 6 is also broadly representative.

The client device 104 may use the SSH configuration file 102 within an SSH client (a software application that may be installed on the client device 104) to initiate an SSH connection with the database platform 118B. To establish the SSH connection with the database platform 118B, the SSH configuration file 102 may first identify that the database platform 118B is within the realm 110B. As such, the client device 104 may initiate a connection with a jumphost 108B.

As shown, each of the realms 110A-B are associated with a respective jumpost 108A-B, respectively. The jumphosts 108A-B, also referred to as jump servers or jumpboxs, act as an intermediary point that facilitates secure access to remote systems within a network. As such, the SSH configuration file 102 may contain rules or configurations relating to a respective jumphost 108A-B, such as its hostname or IP address, authentication methods, and optional user-specific settings. As those skilled in the art readily appreciate, the jumphosts 108A-B may be used to enhance network security by centralizing access control and monitoring SSH traffic. Additionally, the jumphosts 108A-B may require security protocols, such as two-factor authentication or specific access restrictions, thereby safeguarding sensitive systems and data from unauthorized access.

To access resources within the realms 110A-B, the client device 104 may require authorization. For example, to access resources within the restricted realm 110A, the jumphost 108A may require that a user associated with the client device 104 have access privileges to access the restricted realm 110A. If the client device 104 does not have access privileges to the restricted realm 110A, then the jumphost 108A may deny the client device 104 access. In contrast, if the client device 104 is authorized to access the restricted realm 110A, the SSH configuration file 102 may contain the access privileges and, as such, the jumphost 108A may grant the client device 104 access to the restricted realm 110A. It should be appreciated that in some embodiments, a realm may not include a jumphost and other techniques or approaches may be used to access resources within the realm.

Returning to the above example, the client device 104 may establish a connection with the jumphost 108B and gain access to the realm 110B based on access privileges associated with the client device 104. Then, the SSH client running on the client device 104 may use the rules within the SSH configuration file 102 to determine which of the regions 112D-F contains the database platform 118B and connect with the region 112D. As can be appreciated, in some embodiments, the client device 104 may require access privileges to access one or more of the regions 112B-D, and as such, may be denied or granted access based on associated privileges.

Similarly, the client device 104 may have access privileges associated with the type of resource being accessed. For example, the client device 104 may only have authority to access the database platform 118B but may not have authority to access any resources hosted by the servers 114 within the region 112D. In other cases, the client device 104 may only have authority to access resources, such as VMs, running on the servers 114 in the region 112D but may not have authority to access the database platform 118B. It should be appreciated that while the discussion provided herein only focuses on VMs and database platforms as accessed resources, other resources are contemplated herein. The scope of discussion is limited to VMs and database platforms for ease of illustration.

It should also be appreciated, that while the resources within the cloud-infrastructure 106 are discussed herein as grouped into realms, regions, and type of resources, other groups may be present. For example, resources may be grouped into compartments or containers. Depending on the grouping of resources, various rules and directives may be included in the SSH configuration file 102 for navigating to and accessing a desired resource contained within the group. For ease of illustration and discussion, only realms 110A-B, regions 112A-F, and resource types of VMs 116 and database platforms 118A-B are depicted herein.

As described above, in conventional approaches, the SSH configuration file 102 typically contains rules and directives for all resources within the realms 110A-B, and the regions 112A-F regardless of if the client device 104 is authorized to access a respective realm, region, or resource type. For example, under the conventional approach, the SSH configuration file 102 may contain rules for navigating to and accessing the database platform 118A within the restricted realm 110A. The client device 104, however, may not have access privileges to the restricted realm 110A. As such, even if the client device 104 executed the SSH configuration file 102 to navigate to the database platform 118A, the client device 104 would be denied access to the restricted realm 110A. As can be appreciated, in real world applications the cloud-infrastructure 106 may contain hundreds of realms 110A-B, regions 112A-F, and types of resources. As such, a conventional SSH configuration file 102 may contain hundreds of rules that are inapplicable to the client device 104. As noted above, extraneous or irrelevant content within an SSH configuration file 102 can lead to inefficiencies, errors, and security risks.

Moreover, under conventional approaches, even if the client device 104 has authority to the restricted realm 110A, there may be limitations to associated access privileges, such as an authorization expiration date. Since the rules and respective authorization protocols are not performed until the client device 104 attempts to use the SSH configuration file 102. As can be appreciated, because rules and access privileges are not vetted until the SSH configuration file 102 is in flight, this can lead to undesirable delays, workflow interruptions, and negative customer experiences.

Figure 2:
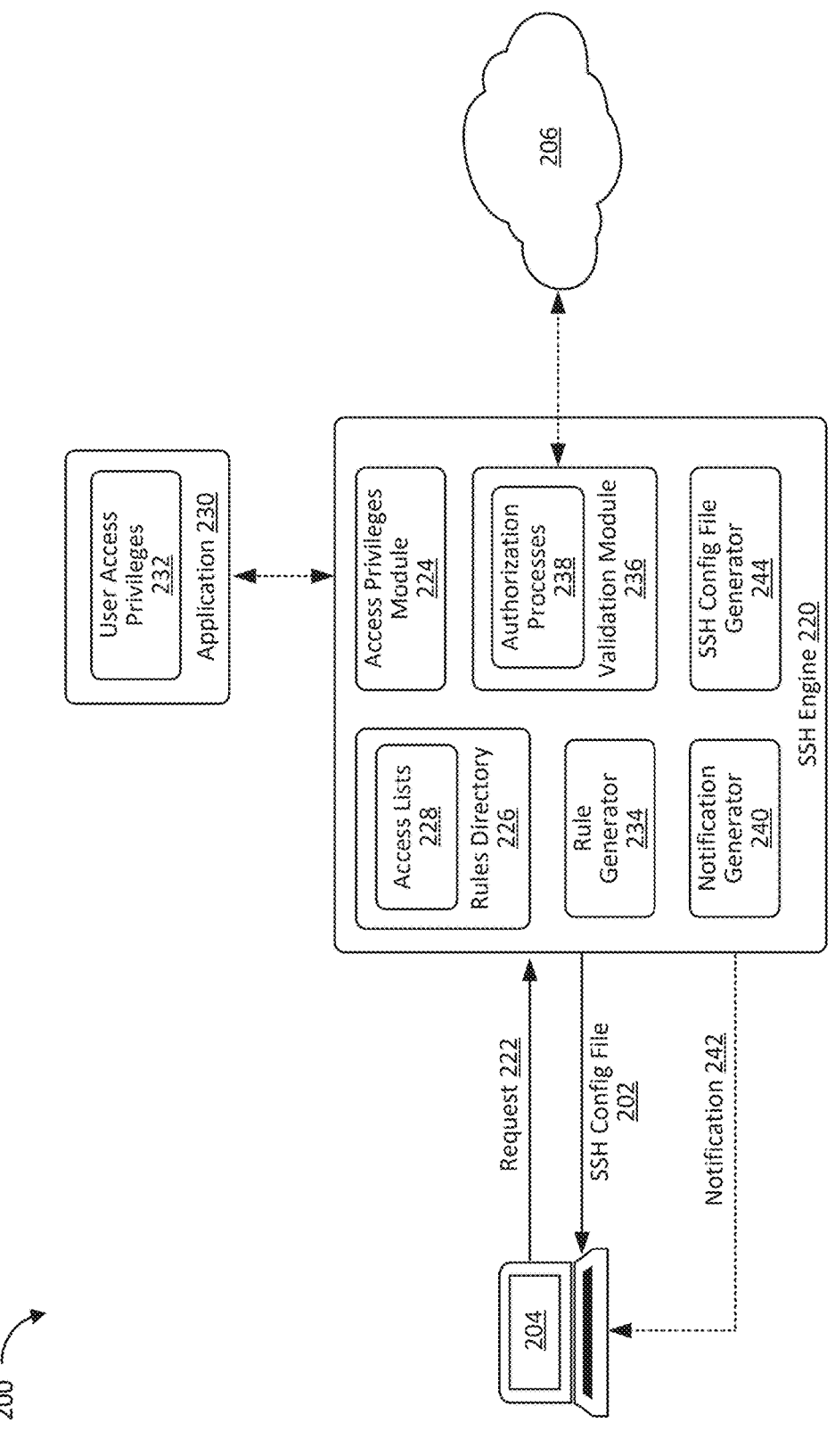
FIG. 2 illustrates an operational environment including an example SSH engine, according to an embodiment herein.

To address shortcomings with conventional SSH configuration files, example SSH engines are provided herein. Referring now to FIG. 2, an operational environment 200 including an example SSH engine 220 is illustrated, according to an embodiment herein. The operational environment 200 may be the same or similar to the operational environment 100 by, for example, including a client device 204 and a cloud infrastructure 206, which may be the same or similar to the client device 104 and the cloud infrastructure 106, respectively. As should be appreciated, the SSH engine 220 may be locally or remotely executed from the client device 204, depending on the configuration. For example, the SSH engine 220 may be hosted and executed by an application service associated with an organization associated with the client device 204. In other cases, the SSH engine 220 may be hosted and executed by a third party.

For ease of explanation, FIG. 2 is described in conjunction with FIG. 3, which provides an example SSH engine process, in particular a process 300 for providing the SSH engine 214 and one or more of its functions, according to an embodiment herein. While FIG. 3 is described with relation to FIG. 2, it should be appreciated that components, elements, and steps from any other Figures described herein may be equally applicable.

The SSH engine 220 may generate an SSH configuration file 202 for the client device 204. Specifically, the SSH engine 220 may generate the SSH configuration file 202 based on the client device 204, or a user associated with the client device 204, such that the SSH configuration file 202 only includes rules and information relevant to the client device 204. That is, the SSH configuration file 202 may only include rules and directives for navigating to and accessing resources that the client device 204 has authority to access. Additionally, as will be described below, the SSH engine 220 may generate the SSH configuration file 202 to include configurations settings or rules for the operating system (OS) of the client device 204. The SSH engine 220 may also validate the rules included in the SSH configuration file 202 before generating the SSH configuration file 202 such to verify the accessibility of various resources for the client device 204. Each of these functions are described in detail below.

To generate the SSH configuration file 202, the SSH engine 220 may receive a request 222 from the client device (350). The request 222 may be a request for an SSH configuration file for the client device 204. Responsive to receiving the request 222, the SSH engine 220 may determine that the client device 204 sent the request 222 and determine access privileges associated with the client device 204 (352). For example, the SSH engine 220 may determine a user profile associated with the client device 204 and determine, based on the user profile, access privileges associated with the user profile.

In some embodiments, the SSH engine 220 may include an access privileges module 224. The access privileges module 224 may determine the access privileges associated with the client device 204 (or user profile). In some cases, the access privileges module 224 may query one or more access lists to determine whether the client device 204 is included in a respective access list. As those skilled in the art readily appreciate, an organization may create and manage a rules directory 226 that may include access lists 228 listing what users have access to various resources. That is, the access lists 228 may include an access list for users who have authority to access the restricted realm 110A and resources hosted therein. As such, the access privileges module 224 may query the rules directory 226 to identify whether the client device 204 is listed on any of the access lists 228. If the client device 204 is listed in a respective access list 228, this may indicate that the client device 204 may have access privileges to the resource(s) associated with the access list 228. It should be appreciated, that while the rules directory 226 is illustrated as part of the SSH engine 220, in other embodiments, the rules directory 226 and/or the access lists 228 may be hosted separately, such as by a third party or application.

In some cases, instead of analyzing the access lists 228 to determine whether the client device 204 has access privileges to respective resource(s), the SSH engine 220 may query a separate application 230 for access privileges associated with the client device 204. For example, the SSH engine 220 may generate a request for access privileges associated with the client device 204 and transmit it to the application 230. In some cases, the SSH engine 220 may generate and send via an API associated with the application 230. The application 230, which may be hosted and managed by a respective organization, may manage user access privileges 232. Responsive to receiving the request from the SSH engine 220, the application 230 may transmit a response to the SSH engine 220 providing the access privileges associated with the client device 204.

Once the SSH engine 220 determines the access privileges associated with the client device 204, the SSH engine 220 may determine rules associated with the access privileges. For examples, the access privileges may indicate that the client device 204 has access privileges to the realm 110B but not the realm 110A. Within the realm 110B, the access privileges may indicate that the client device 204 has authority to access only the regions 112D-E, and only intermediary VMs hosted by the servers 114 within those regions. Based on this, the SSH engine 220 may determine the rules (e.g., directives, protocols, information) for navigating to and accessing the realm 110B, the regions 112D-E, and servers 114 within the regions 112D-E. Unlike conventional SSH configuration files, rules for the realm 110A (and regions therein), the region 112F, and the database platform 118B are not included because the client device 204 does not have authority to access these resources.

In some embodiments, the SSH engine 220 may include a rule generator 234. The rule generator 234 may determine the rules associated with the access privileges for the client device 204. For example, the rule generator 234 may query the rules directory 226 for the identified rules. The rules directory 226 may contain the rules for navigating to and accessing all resources associated with a respective organization. Since the client device 204 only has authority to access a portion of the resources, then rule generator 234 may identify and generate rules for the SSH configuration file 202 based on the access privileges. In some cases, the rule generator 234 may fetch respective rules from the rules directory 226.

In addition to generating rules for accessing resources, the rule generator 234 may also generate configuration settings or rules based on the OS of the client device 204. As noted above, incompatibility between the configuration settings in an SSH configuration file and a client device's OS can cause inconsistencies and errors, including authentication failures. As such, the SSH engine 220 may generate configuration settings or rules based on the OS of the client device 204 such that the SSH configuration file 202 is compatible with the client device 204.

Once the rules are generated, the SSH engine 220 may validate each of the rules (356). In particular, the SSH engine 220 may include a validation module 236 that may validate each of the generated rules. As noted above, each of the rules may include an authentication protocol needed for accessing a respective resource, such as the realm 110B. As such, to validate a rule for accessing the realm 110B, the validation module 236 may perform one or more authorization processes 238. Example authorization processes 238 may include password authentication, public key authentication, host-based authentication, GSSAPI (Generic Security Services Application Program Interface) authentication, and the like. In some cases, to validate the rules, the validation module 236 may communicate with the infrastructure 206, and in some cases, gain access to a respective resource, such as the realm 110B, to verify the authentication of the given rule.

As noted above, by validating each rule before generating the SSH configuration file 202, the SSH engine 220 can ensure that when the client device 204 goes to use the SSH configuration file 202, the client device 204 can efficiently and quickly gain access to respective resources. If during the validation process, the validation module 236 identifies one or more rules as invalid (e.g., unable to pass a respective authorization process 238), the SSH engine 220 may generate a notification of the issue. In particular, the SSH engine 220 may include a notification generator 240 that may generate a notification 242 of an invalid rule. In some cases, the notification 242 may include information, such as a respective access privilege that has limitations resulting in the invalid rule.

In an illustrative example, the client device 204 may have access privileges associated with the restricted realm 110A. However, as part of the access privileges, the client device 204 may have to submit renewal paperwork or perform an interview once a year. Based on the timing of the SSH configuration file 202 generation, the access privileges for the restricted realm 110A may be expired since the respective action has not yet been renewed. As such, while the access privileges may indicate that the client device 204 has authority to access the restricted realm 110A, during the validation process, the authorization process 238 may fail due to the expired access privilege. As such, the notification 242 may indicate that the access privileges related to the restricted realm 110A expired and request that the client device 204 rectify the expiration. In some cases, responsive to receiving the notification 242, the client device 204 may remedy the limitation with the access privileges. Once the limitations are fixed (e.g., the paperwork updated), the SSH engine 220 may perform the validation process again to validate the respective rule.

Once the rules are validated, the SSH engine 220 may generate the SSH configuration file 202 (358). In particular, an SSH configuration file generator 244 (hereinafter "generator 244") may generate the SSH configuration file 202. The generator 244 may generate the file such that the client device 204 can execute the SSH configuration file 202 to access a desired resource. In some cases, the generator 244 may consolidate all the rules generated by the rule generator 234 and format them into an executable file. Once the SSH configuration file 202 is generated, the SSH engine 220 may transmit the SSH configuration file 202 to the client device.

In some embodiments, the SSH engine 220 may periodically or at set intervals perform an update to the SSH configuration file 202. That is, at set intervals of time, the SSH engine 220 may re-query the access privileges associated with the client device 204 to determine if there have been any changes. If there have been any changes to the access privileges, the SSH engine 220 may revise the rules included in the SSH configuration file 202 (e.g., remove rules that are no longer applicable or add new rules) and validate the revised rules. As can be appreciated, access privileges may change as a user changes positions within an organization, policies or security procedures change, or additional resources are added to the cloud-infrastructure 206. As such, it may be advantageous for the SSH engine 220 to periodically update the rules included in the SSH configuration file 202 to match any changes made to the access privileges. Once the rules in the SSH configuration file 202 are updated and validated, the SSH engine 220 may provide an updated SSH configuration file to the client device 204.

Figure 4:
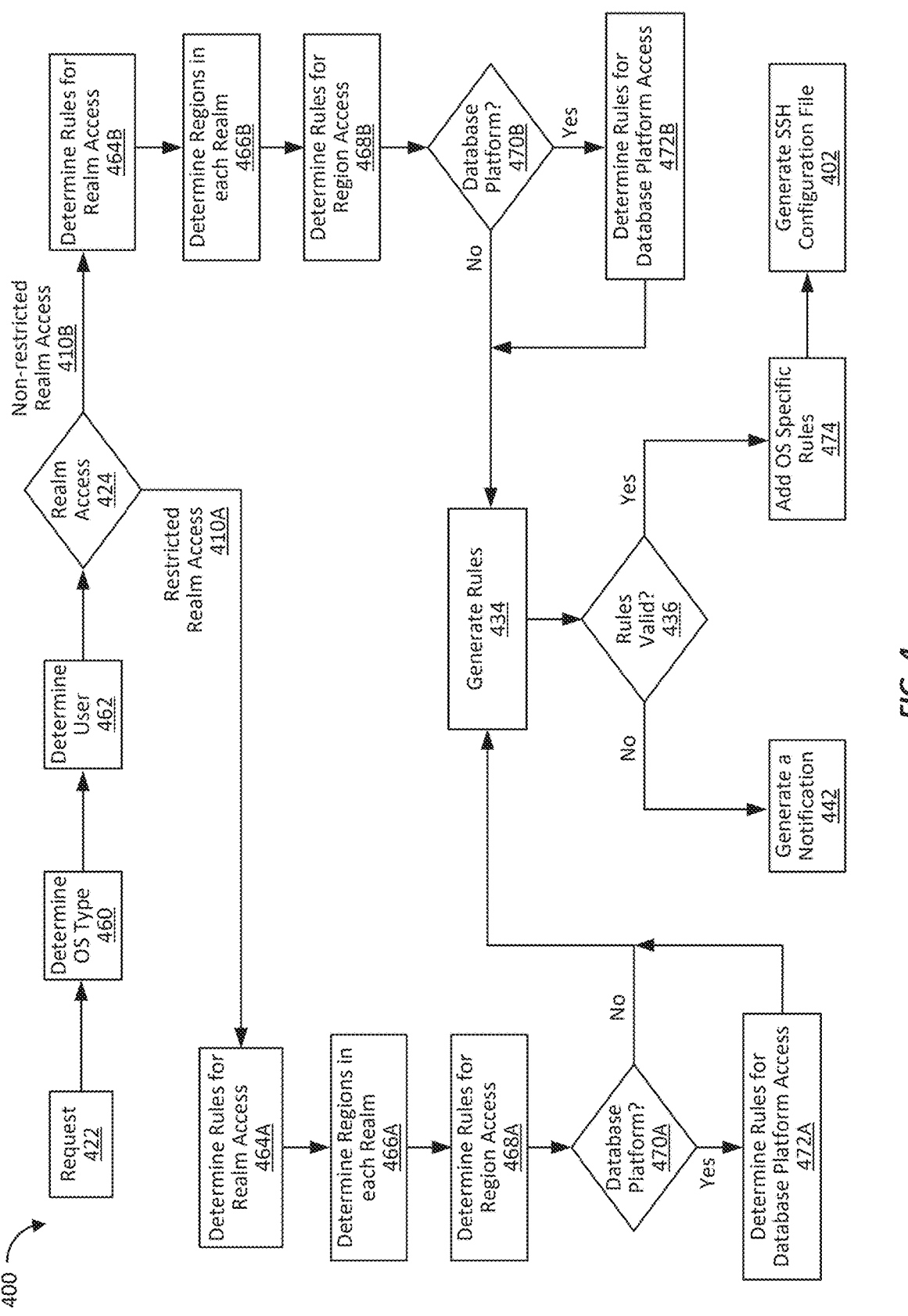
FIG. 4 illustrates an example flow for generating a user specific SH configuration file, according to an embodiment herein.

Referring now to FIG. 4, an illustrative flow 400 for generating a user specific SSH configuration file is illustrated, according to an embodiment herein. In particular, the flow 400 may be performed by an SSH engine, such as the SSH engine 220. As shown, the flow 400 may begin with a request 422 may be received. Responsive to receiving the request 422, an OS type may be determined 460. As noted above, the OS type may be determined based on the OS of a client device submitting the request 422. Similarly, responsive to the request 422 a user may be determined 462. In particular, a user associated with the request 422 may be determined, such as a user profile associated with the client device submitting the request 422.

Once the user is determined, a determination may be made whether the user has access to a variety of resources (e.g., realms, regions, resource types). As illustrated, the flow 400 may include walking through realms based on the security requirements of each respective realm. For example, for a restricted realm, such as the restricted realm 110A, the SSH engine may first walk through each level of access and generate rules for each respective resource within the restricted realm 110A before doing the same process for the unrestricted realm 110B. In other cases, the opposite approach may be performed (e.g., the unrestricted realm 110B first and then the restricted realm 110A). In still other cases, the flows for the restricted realm and the unrestricted realm may be performed in tandem, in parallel, or sequentially.

At 424, realm access may be determined based on the access privileges associated with the user. As described above, the access privileges may identify whether a respective user has authority to access various resources. For example, if at 424, it is determined that the user does not have access to restricted realms, such as the restricted realm 110A, then the flow 400 may continue via 410B based on the user's non-restricted realm access. In contrast, if the user has access to the restricted realm, then the flow 400 may continue via 410A based on the restricted realm access. As noted above, if the user has access to both, then the flow 400 may perform the flows via 410A and 410B in parallel or sequentially.

Following 410A, once the determination is made that the user has restricted realm access, then rules for realm access are determined 464A. Each realm may include multiple regions and as such, there may be a determination on what regions are in a respective realm 466A. Based on the regions in a respective realm, rules for region access may be determined 468A. In some cases, there may be an additional step (not shown) in which the user's ability to access a respective region within a realm is determined. In some cases, the user may not have authority to access one or more regions within a realm, even if the user has authority to access a respective realm. Again, such a determination may be made based on the access privileges associated with the user.

Next, a determination on resource type may be made. In the illustrated flow 400, the determination is whether the user has authority to access a database platform 470A. As noted above, in some cases, access to various types of resources may be restricted to only authorized persons. As such, the SSH engine may determine what the resource type is and whether the user has authority to access that type of resource. Here, if the user has authority to access database platforms 470A, specifically those in the restricted realm 110A, then the SSH engine may determine rules for accessing the database platform 472A. If the resource type does not have a restriction on access, such as a VM, then the SSH may continue and generate rules 434 based on the steps 464A, 466A, and 468A. If the resource type does contain restrictions, then the SSH may determine those rules (e.g., at 472A) and generate rules 434 based on the steps 464A, 466A, 468A, and 472A.

For rules associated with accessing non-restricted realms, such as the non-restricted realm 110B, the flow 400 may include the similar steps of 464B, 466B, 468B, 470B, and 472B. Once the rules for the respective realms, regions, and resource types are determined for the non-restricted realm, then the SSH engine may generate the rules 434. Once the flow 400 has determined and generated the rules for both the non-restricted realms and the restricted realms (if the user has authority to access), then the SSH engine may validate the rules 436. If the rules are invalid, then the SSH engine may generate a notification 442. As noted above, the notification 442 may indicate the rule that failed and/or an associated access privilege that has limitations preventing validation of the rule.

In contrast, if each rule is validated, then the SSH engine may add OS specific rules or configuration settings. As can be appreciated, since the OS rules or configuration settings may not require validation, they may be added after the rules for accessing resources are validated. Once the validated rules and the OS specific rules are consolidated, the SSH engine may generate the SSH configuration file 402. Once the SSH configuration file 402 is generated, the SSH engine may transmit or otherwise provide the SSH configuration file 402 to the client device for use.

It should be appreciated that while the discussion herein is made with reference to a SSH configuration file, the term "file" refers to any SSH configuration data that is used by a client device to navigate to and/or access remote resources, regardless of format, location, or type of storage technology. For example, the data within the SSH configuration file 204 may be stored remotely in a SSH configuration database (not shown) and a link created for the client device 204 to access the respective SSH configuration data within the database. In such a case, it is contemplated herein that the SSH configuration data corresponding to multiple client devices may be stored within the same SSH configuration database and respective SSH configuration data may be recalled for a respective client device responsive to a request. Additionally, it should be appreciated that while the discussion herein focuses on an embodiment in which a single SSH configuration file is generated for the client device, the SSH configuration data within the SSH configuration file 204 may be spread across more than one file or location.

Referring now to FIG. 5, is a diagram of a system 500 configured to implement an SSH engine, according to an embodiment herein. The system 500 may be an example of an apparatus including a computing apparatus 591 that is representative of any system or collection of systems in which the various processes, systems, programs, services, and scenarios disclosed herein may be implemented. For example, computing apparatus 591 may be an example SSH engine, such as the SSH engine 220, a client device, such as the client device 104, or any of the subcomponents depicted in environments 100 or 200 of FIGS. 1 and 2, respectively. Examples of computing apparatus 591 include, but are not limited to, server computers, desktop computers, laptop computers, routers, switches, web servers, cloud computing platforms, and data center equipment, as well as any other type of physical or virtual server machine, physical or virtual router, container, and any variation or combination thereof.

Computing apparatus 591 may be implemented as a single apparatus, system, or device or may be implemented in a distributed manner as multiple apparatuses, systems, or devices. Computing apparatus 591 may include, but is not limited to, processing system 596, storage system 593, software 595, communication interface system 597, and user interface system 599. Processing system 596 may be operatively coupled with storage system 593, communication interface system 597, and user interface system 599.

Processing system 596 may load and execute software 595 from storage system 593. Software 595 may include an SSH engine 592, which may be representative of any of the operations for providing an SSH engine or any of its related functions, as discussed with respect to the preceding figures. When executed by processing system 596, software 595 may direct processing system 596 to operate as described herein for at least the various processes, such as the process 300 or flow 400, operational scenarios, and sequences discussed in the foregoing implementations. Computing apparatus 591 may optionally include additional devices, features, or functionality not discussed for purposes of brevity.

In some embodiments, processing system 596 may comprise a micro-processor and other circuitry that retrieves and executes software 595 from storage system 593. Processing system 596 may be implemented within a single processing device but may also be distributed across multiple processing devices or sub-systems that cooperate in executing program instructions. Examples of processing system 596 may include general purpose central processing units, graphical processing units, application specific processors, and logic devices, as well as any other type of processing device, combinations, or variations thereof.

Storage system 593 may comprise any memory device or computer-readable storage medium readable by processing system 596 and capable of storing software 595. Storage system 593 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer-readable storage medium a propagated signal.

In addition to computer-readable storage medium, in some implementations storage system 593 may also include computer readable communication media over which at least some of software 595 may be communicated internally or externally. Storage system 593 may be implemented as a single storage device but may also be implemented across multiple storage devices or sub-systems co-located or distributed relative to each other. Storage system 593 may comprise additional elements, such as a controller, capable of communicating with processing system 596 or possibly other systems.

Software 595 (including the SSH engine 592 among other functions) may be implemented in program instructions that may, when executed by processing system 596, direct processing system 596 to operate as described with respect to the various operational scenarios, sequences, and processes illustrated herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multithreaded, or in accordance with any other suitable execution paradigm, variation, or combination thereof. Software 595 may include additional processes, programs, or components, such as operating system software, virtualization software, or other application software. Software 595 may also comprise firmware or some other form of machine-readable processing instructions executable by processing system 596.

In general, software 595 may, when loaded into processing system 596 and executed, transform a suitable apparatus, system, or device (of which computing apparatus 591 is representative) overall from a general-purpose computing system into a special-purpose computing system as described herein. Indeed, encoding software 595 on storage system 593 may transform the physical structure of storage system 593. The specific transformation of the physical structure may depend on various factors in different implementations of this description. Examples of such factors may include, but are not limited to, the technology used to implement the storage media of storage system 593 and whether the computer-storage media are characterized as primary or secondary storage, as well as other factors.

For example, if the computer-readable storage medium is implemented as semiconductor-based memory, software 595 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 597 may include communication connections and devices that allow for communication with other computing systems (not shown) over communication networks (not shown). Examples of connections and devices that together allow for inter-system communication may include network interface cards, antennas, power amplifiers, radio-frequency (RF) circuitry, transceivers, and other communication circuitry. The connections and devices may communicate over communication media to exchange communications with other computing systems or networks of systems, such as metal, glass, air, or any other suitable communication media.

Communication between the computing apparatus 591 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, which may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more memory devices or computer readable medium(s) having computer readable program code embodied thereon.

The foregoing examples and descriptions are described herein in the context of systems and methods for providing an SSH engine or one or more of its related functions. Those of ordinary skill in the art will realize that these descriptions are illustrative only and are not intended to be in any way limiting. Reference is made in detail to implementations of examples as illustrated in the accompanying drawings. The same reference indicators are used throughout the drawings and the description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. That is, the foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in an embodiment," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all the following interpretations of the word: any of the items in the list, all the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub combinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for" but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

Examples

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

As used below, any reference to a series of examples is to be understood as a reference to each of those examples disjunctively (e.g., "Examples 1-4" is to be understood as "Examples 1, 2, 3, or 4").

Example 1 is a computing apparatus comprising: a computer-readable storage medium; an SSH engine comprising processor-executable instructions stored on the computer-readable storage medium; and one or more processors coupled to the computer-readable storage medium and configured to execute the processor-executable instructions, wherein the processor-executable instructions, when executed by the one or more processors, direct the computing apparatus, to at least: receive, from a client device, a request for a Secured Shell (SSH) configuration file; determine access privileges associated with the client device; generate a plurality of rules based on the access privileges, validate each rule of the plurality of rules based on the access privileges; and generate the SSH configuration file for the client device, wherein the SSH configuration file comprises the plurality of rules.

Example 2 is the computing apparatus of any previous or subsequent Example, wherein the processor-executable instructions to generate the plurality of rules based on the access privileges, when executed by the one or more processors, further direct the computing apparatus to: determine, based on the access privileges, one or more realms that the client device comprises authority to access; determine, based on the access privileges, a plurality of regions within each respective realm of the one or more realms that the client device comprises authority to access; and generate the plurality of rules based on the one or more realms and the plurality of regions within each respective realm of the one or more realms, wherein the plurality of rules comprises rules for accessing the one or more realms and the plurality of regions.

Example 3 is the computing apparatus of any previous or subsequent Example, wherein the processor-executable instructions to validate each rule of the plurality of rules based on the access privileges, when executed by the one or more processors, further direct the computing apparatus to: perform an authentication process associated with each rule of the plurality of rules; determine that access is granted to a respective resource based on the authentication process for each rule; and validate each rule of the plurality of rules based on the granted access.

Example 4 is the computing apparatus of any previous or subsequent Example, wherein the processor-executable instructions to generate the plurality of rules based on the access privileges, when executed by the one or more processors, further direct the computing apparatus to: determine, based on the access privileges, a plurality of realms that the client device comprises authority to access, wherein the plurality of realms comprises one or more a restricted realm or a non-restricted realm; determine, based on the access privileges, a plurality of regions within each of the plurality of realms that the client device comprises authority to access; generate a first set of rules for accessing the plurality of realms; generate a second set of rules for accessing the plurality of regions; and generate the plurality of rules based on the first set of rules and the second set of rules.

Example 5 is the computing apparatus of any previous or subsequent Example, wherein the processor-executable instructions, when executed by the one or more processors, further direct the computing apparatus to: determine an operating system (OS) type based on the client device; determine one or more configuration settings based on the operating system of the client device; and generate the one or more configuration settings to be included in the SSH configuration file based on the operating system of the client device.

Example 6 is the computing apparatus of any previous or subsequent Example, wherein the processor-executable instructions, when executed by the one or more processors, further direct the computing apparatus to: transmit the SSH configuration file to the client device responsive to generation of the SSH configuration file.

Example 7 is the computing apparatus of any previous or subsequent Example, wherein the processor-executable instructions to validate each rule of the plurality of rules based on the access privileges, when executed by the one or more processors, further direct the computing apparatus to: determine, using each rule of the plurality of rules, that the client device comprises authority to access a respective resource.

Example 8 is a method comprising: receiving, by an SSH engine, a request for a Secured Shell (SSH) configuration file from a client device; determining, by the SSH engine, access privileges associated with the client device; generating, by the SSH engine, a plurality of rules based on the access privileges; validating, by the SSH engine, each rule of the plurality of rules based on the access privileges; and generating, by the SSH engine, the SSH configuration file for the client device, wherein the SSH configuration file comprises the plurality of rule.

Example 9 is the method of any previous or subsequent Example, wherein determining, by the SSH engine, the access privileges associated with the client device comprises: generating, by the SSH engine, a request for the access privileges associated with the client device; transmitting, by the SSH engine, the request to via an Application Program Interface (API); and receiving, by the SSH engine, the access privileges associated with the client device from the API.

Example 10 is the method of any previous or subsequent Example, wherein generating, by the SSH engine, a plurality of rules based on the access privileges comprises: determining, by the SSH engine, one or more realms that the client device comprises authority to access based on the access privileges; and generating, by the SSH engine, the plurality of rules based on the one or more realms, wherein one or more of the plurality of rules comprise rules for accessing the one or more realms.

Example 11 is the method of any previous or subsequent Example, wherein validating, by the SSH engine, each rule of the plurality of rules based on the access privileges comprises: performing, by the SSH engine, an authentication process associated with each rule of the plurality of rules; determining, by the SSH engine, that access is granted to a respective resource based on the authentication process for each rule; and validating, by the SSH engine, each rule of the plurality of rules based on the granted access.

Example 12 is the method of any previous or subsequent Example, wherein generating, by the SSH engine, the plurality of rules based on the access privileges comprises: determining, by the SSH engine, a plurality of realms that the client device comprises authority to access, wherein the plurality of realms comprises one or more restricted realms and one or more non-restricted realms; generating, by the SSH engine, a first set of rules for accessing the one or more restricted realms; and generating, by the SSH engine, a second set of rules for accessing the one or more non-restricted realms, wherein the plurality of rules comprises the first set of rules and the second set of rules.

Example 13 is the method of any previous or subsequent Example, wherein the plurality of rules comprises: a first set of rules for accessing one or more realms; a second set of rules for accessing one or more regions within each of the one or more realms; and a third set of rules for accessing one or more resources within each of the one or more regions.

Example 14 is the method of any previous or subsequent Example, wherein validating, by the SSH engine, each rule of the plurality of rules based on the access privileges comprises: determining, by the SSH engine, that a first rule of the plurality of rules is invalid based on the access privileges; generating, by the SSH engine, a notification indicating that the first rule is invalid; receiving, by the SSH engine, an indicating of an update to the access privileges; and determining, by the SSH engine, that the first rule of the plurality of rules is valid based on the update to the access privileges.

Example 15 is a computer-readable storage medium comprising processor-executable instructions, wherein the processor-executable instructions comprise an SSH engine configured to cause one or more processors to: receive, from a client device, a request for a Secured Shell (SSH) configuration file; determine one or more access privileges associated with the client device; generate a plurality of rules based on the one or more access privileges, validate each rule of the plurality of rules based on the access privileges; and generate the SSH configuration file for the client device, wherein the SSH configuration file comprises the plurality of rules.

Example 16 is the computer-readable storage medium of any previous or subsequent Example, wherein the processor-executable instructions of the SSH engine to generate the plurality of rules based on the access privileges cause the one or more processors to further execute processor-executable instructions stored in the computer-readable storage medium to: determine, based on the access privileges, a plurality of realms that the client device comprises authority to access; generate a first set of rules for accessing the plurality of realms; determine, based on the access privileges, a plurality of regions within each of the plurality of realms that the client device comprises authority to access; generate a second set of rules for accessing the plurality of regions; determine, based on the access privileges, one or more resources within each of the plurality of regions that the client device comprises authority to access; and generate a third set of rules for accessing the one or more resources, wherein the plurality of rules comprises the first set of rules, the second set of rules, and the third set of rules.

Example 17 is the computer-readable storage medium of any previous or subsequent Example, wherein the processor-executable instructions of the SSH engine to validate each rule of the plurality of rules based on the access privileges cause the one or more processors to further execute processor-executable instructions stored in the computer-readable storage medium to: determine that a first rule of the plurality of rules is invalid based on the access privileges; generate a notification indicating that the first rule is invalid; and transmit the notification to the client device.

Example 18 is the computer-readable storage medium of any previous or subsequent Example, wherein the processor-executable instructions of the SSH engine to determine the access privileges associated with the client device cause the one or more processors to further execute processor-executable instructions stored in the computer-readable storage medium to: determine a plurality of access lists, wherein each access list of the plurality of access lists is associated with a respective resource; and determine the access privileges associated with the client device based on the plurality of access lists, wherein the access privileges indicate the client device's authority to access a plurality of resources.

Example 19 is the computer-readable storage medium of any previous or subsequent Example, wherein the processor-executable instructions of the SSH engine to generate the plurality of rules based on the access privileges cause the one or more processors to further execute processor-executable instructions stored in the computer-readable storage medium to: determine one or more restricted realms that the client device comprises authority to access based on the access privileges, wherein the one or more restricted realms comprise a plurality of resources; and generate the plurality of rules based on the one or more restricted realms, wherein the plurality of rules comprises rules for accessing the plurality of resources within the one or more restricted realms.

Example 20 is the computer-readable storage medium of any previous or subsequent Example, wherein the processor-executable instructions cause the one or more processors to further execute processor-executable instructions stored in the computer-readable storage medium to: determine an operating system (OS) for the client device; and generate one or more configuration settings based on the OS of the client device, wherein the plurality of rules comprises the one or more configuration settings.

What is claimed is:

1. A computing apparatus comprising:
a computer-readable storage medium;
an SSH engine comprising processor-executable instructions stored on the computer-readable storage medium; and
one or more processors coupled to the computer-readable storage medium and configured to execute the processor-executable instructions, wherein the processor-executable instructions, when executed by the one or more processors, direct the computing apparatus, to at least:
receive, from a client device, a request for a Secured Shell (SSH) configuration file;
determine access privileges associated with the client device;
generate a plurality of rules based on the access privileges,
validate each rule of the plurality of rules based on the access privileges; and
generate the SSH configuration file for the client device, wherein the SSH configuration file comprises the plurality of rules.

2. The computing apparatus of claim 1, wherein the processor-executable instructions to generate the plurality of rules based on the access privileges, when executed by the one or more processors, further direct the computing apparatus to:
determine, based on the access privileges, one or more realms that the client device comprises authority to access;
determine, based on the access privileges, a plurality of regions within each respective realm of the one or more realms that the client device comprises authority to access; and
generate the plurality of rules based on the one or more realms and the plurality of regions within each respective realm of the one or more realms, wherein the plurality of rules comprises rules for accessing the one or more realms and the plurality of regions.

3. The computing apparatus of claim 1, wherein the processor-executable instructions to validate each rule of the plurality of rules based on the access privileges, when executed by the one or more processors, further direct the computing apparatus to:
perform an authentication process associated with each rule of the plurality of rules;
determine that access is granted to a respective resource based on the authentication process for each rule; and
validate each rule of the plurality of rules based on the granted access.

4. The computing apparatus of claim 1, wherein the processor-executable instructions to generate the plurality of rules based on the access privileges, when executed by the one or more processors, further direct the computing apparatus to:
determine, based on the access privileges, a plurality of realms that the client device comprises authority to access, wherein the plurality of realms comprises one or more a restricted realm or a non-restricted realm;

determine, based on the access privileges, a plurality of regions within each of the plurality of realms that the client device comprises authority to access;

generate a first set of rules for accessing the plurality of realms;

generate a second set of rules for accessing the plurality of regions; and generate the plurality of rules based on the first set of rules and the second set of rules.

5. The computing apparatus of claim 1, wherein the processor-executable instructions, when executed by the one or more processors, further direct the computing apparatus to:

determine an operating system (OS) type based on the client device;

determine one or more configuration settings based on the operating system of the client device; and generate the one or more configuration settings to be included in the SSH configuration file based on the operating system of the client device.

6. The computing apparatus of claim 1, wherein the processor-executable instructions, when executed by the one or more processors, further direct the computing apparatus to:

transmit the SSH configuration file to the client device responsive to generation of the SSH configuration file.

7. The computing apparatus of claim 1, wherein the processor-executable instructions to validate each rule of the plurality of rules based on the access privileges, when executed by the one or more processors, further direct the computing apparatus to:

determine, using each rule of the plurality of rules, that the client device comprises authority to access a respective resource.

8. A method comprising:

receiving, by an SSH engine, a request for a Secured Shell (SSH) configuration file from a client device;

determining, by the SSH engine, access privileges associated with the client device;

generating, by the SSH engine, a plurality of rules based on the access privileges;

validating, by the SSH engine, each rule of the plurality of rules based on the access privileges; and generating, by the SSH engine, the SSH configuration file for the client device, wherein the SSH configuration file comprises the plurality of rule.

9. The method of claim 8, wherein determining, by the SSH engine, the access privileges associated with the client device comprises:

generating, by the SSH engine, a request for the access privileges associated with the client device;

transmitting, by the SSH engine, the request to via an Application Program Interface (API); and receiving, by the SSH engine, the access privileges associated with the client device from the API.

10. The method of claim 8, wherein generating, by the SSH engine, a plurality of rules based on the access privileges comprises:

determining, by the SSH engine, one or more realms that the client device comprises authority to access based on the access privileges; and generating, by the SSH engine, the plurality of rules based on the one or more realms, wherein one or more of the plurality of rules comprise rules for accessing the one or more realms.

11. The method of claim 8, wherein validating, by the SSH engine, each rule of the plurality of rules based on the access privileges comprises:

performing, by the SSH engine, an authentication process associated with each rule of the plurality of rules;

determining, by the SSH engine, that access is granted to a respective resource based on the authentication process for each rule; and validating, by the SSH engine, each rule of the plurality of rules based on the granted access.

12. The method of claim 8, wherein generating, by the SSH engine, the plurality of rules based on the access privileges comprises:

determining, by the SSH engine, a plurality of realms that the client device comprises authority to access, wherein the plurality of realms comprises one or more restricted realms and one or more non-restricted realms;

generating, by the SSH engine, a first set of rules for accessing the one or more restricted realms; and generating, by the SSH engine, a second set of rules for accessing the one or more non-restricted realms, wherein the plurality of rules comprises the first set of rules and the second set of rules.

13. The method of claim 8, wherein the plurality of rules comprises:

a first set of rules for accessing one or more realms;

a second set of rules for accessing one or more regions within each of the one or more realms; and a third set of rules for accessing one or more resources within each of the one or more regions.

14. The method of claim 8, wherein validating, by the SSH engine, each rule of the plurality of rules based on the access privileges comprises:

determining, by the SSH engine, that a first rule of the plurality of rules is invalid based on the access privileges;

generating, by the SSH engine, a notification indicating that the first rule is invalid;

receiving, by the SSH engine, an indicating of an update to the access privileges; and determining, by the SSH engine, that the first rule of the plurality of rules is valid based on the update to the access privileges.

15. A computer-readable storage medium comprising processor-executable instructions, wherein the processor-executable instructions comprise an SSH engine configured to cause one or more processors to:

receive, from a client device, a request for a Secured Shell (SSH) configuration file;

determine one or more access privileges associated with the client device;

generate a plurality of rules based on the one or more access privileges, validate each rule of the plurality of rules based on the access privileges; and generate the SSH configuration file for the client device, wherein the SSH configuration file comprises the plurality of rules.

16. The computer-readable storage medium of claim 15, wherein the processor-executable instructions of the SSH engine to generate the plurality of rules based on the access privileges cause the one or more processors to further execute processor-executable instructions stored in the computer-readable storage medium to:

determine, based on the access privileges, a plurality of realms that the client device comprises authority to access;

generate a first set of rules for accessing the plurality of realms;

determine, based on the access privileges, a plurality of regions within each of the plurality of realms that the client device comprises authority to access;

generate a second set of rules for accessing the plurality of regions;

determine, based on the access privileges, one or more resources within each of the plurality of regions that the client device comprises authority to access; and generate a third set of rules for accessing the one or more resources, wherein the plurality of rules comprises the first set of rules, the second set of rules, and the third set of rules.

17. The computer-readable storage medium of claim 15, wherein the processor-executable instructions of the SSH engine to validate each rule of the plurality of rules based on the access privileges cause the one or more processors to further execute processor-executable instructions stored in the computer-readable storage medium to:

determine that a first rule of the plurality of rules is invalid based on the access privileges;

generate a notification indicating that the first rule is invalid; and transmit the notification to the client device.

18. The computer-readable storage medium of claim 15, wherein the processor-executable instructions of the SSH engine to determine the access privileges associated with the client device cause the one or more processors to further execute processor-executable instructions stored in the computer-readable storage medium to:

determine a plurality of access lists, wherein each access list of the plurality of access lists is associated with a respective resource; and determine the access privileges associated with the client device based on the plurality of access lists, wherein the access privileges indicate the client device's authority to access a plurality of resources.

19. The computer-readable storage medium of claim 15, wherein the processor-executable instructions of the SSH engine to generate the plurality of rules based on the access privileges cause the one or more processors to further execute processor-executable instructions stored in the computer-readable storage medium to:

determine one or more restricted realms that the client device comprises authority to access based on the access privileges, wherein the one or more restricted realms comprise a plurality of resources; and generate the plurality of rules based on the one or more restricted realms, wherein the plurality of rules comprises rules for accessing the plurality of resources within the one or more restricted realms.

20. The computer-readable storage medium of claim 15, wherein the processor-executable instructions cause the one or more processors to further execute processor-executable instructions stored in the computer-readable storage medium to:

determine an operating system (OS) for the client device; and generate one or more configuration settings based on the OS of the client device, wherein the plurality of rules comprises the one or more configuration settings.

* * * * *